United States Patent
Saito et al.

(10) Patent No.: US 7,662,223 B2
(45) Date of Patent: Feb. 16, 2010

(54) AQUEOUS INK-JET INK COMPOSITION

(75) Inventors: Takashi Saito, Ibaraki (JP); Hiroki Yamamoto, Ibaraki (JP)

(73) Assignee: Riso Kagaku Corporation (JP)

( * ) Notice: Subject to any disclaimer, the term of this patent is extended or adjusted under 35 U.S.C. 154(b) by 0 days.

(21) Appl. No.: 12/306,033

(22) PCT Filed: Jun. 15, 2007

(86) PCT No.: PCT/JP2007/062081
§ 371 (c)(1),
(2), (4) Date: Feb. 3, 2009

(87) PCT Pub. No.: WO2007/148617
PCT Pub. Date: Dec. 27, 2007

(65) Prior Publication Data
US 2009/0199738 A1 Aug. 13, 2009

(30) Foreign Application Priority Data
Jun. 22, 2006 (JP) .............................. 2006-172030

(51) Int. Cl.
*C09D 11/02* (2006.01)
(52) U.S. Cl. .............. 106/31.35; 106/31.58; 106/31.67; 106/31.86; 106/31.89
(58) Field of Classification Search .............. 106/31.35, 106/31.58, 31.59, 31.67, 31.86, 31.89; 347/100
See application file for complete search history.

(56) References Cited

U.S. PATENT DOCUMENTS

| 5,190,582 A | * | 3/1993 | Shinozuka et al. | ....... 106/31.65 |
| 5,623,294 A | | 4/1997 | Takizawa et al. | |
| 5,750,592 A | | 5/1998 | Shinozuka et al. | |
| 6,149,720 A | * | 11/2000 | Asada et al. | .............. 106/31.26 |
| 7,582,153 B2 | * | 9/2009 | Ishimaru et al. | .......... 106/31.67 |
| 2006/0074144 A1 | * | 4/2006 | Watanabe et al. | ............ 523/160 |
| 2006/0074145 A1 | * | 4/2006 | Hayashi et al. | .............. 523/160 |
| 2009/0013901 A1 | * | 1/2009 | Asada et al. | .............. 106/31.13 |
| 2009/0025605 A1 | * | 1/2009 | Ishimaru et al. | .......... 106/31.86 |

FOREIGN PATENT DOCUMENTS

| JP | 54005871 A | 1/1979 |
| JP | 4008777 A | 1/1992 |
| JP | 8118674 A | 5/1996 |
| JP | 2004299341 A | 10/2001 |
| JP | 2002256183 A | 9/2002 |
| JP | 2002283546 A | 10/2002 |
| JP | 2004202708 A | 7/2004 |

OTHER PUBLICATIONS

International Search Report—PCT/JP2007/062081—Dated: Sep. 20, 2007.

* cited by examiner

*Primary Examiner*—Helene Klemanski
(74) *Attorney, Agent, or Firm*—Studebaker & Brackett PC; Donald R. Studebaker

(57) ABSTRACT

An aqueous ink-jet ink composition contains: (i) a polyglycerol fatty acid ester, in which the number of carbon atoms of the fatty acid moiety is equal to 14, the polyglycerol fatty acid ester being contained in a proportion falling within the range of more than 0.1% by mass to less than 3.5% by mass, and (ii) an acetylene glycol, in which the number of mols of ethylene oxide added is equal to at least 10 mols, the acetylene glycol being contained in a proportion falling within the range of 0.2% by mass, inclusive, to 10% by mass, inclusive.

2 Claims, 2 Drawing Sheets

AQUEOUS INK-JET INK COMPOSITION

TECHNICAL FIELD

This invention relates to an ink composition for use in a printer for performing a recording operation. This invention particularly relates to an aqueous ink composition.

BACKGROUND ART

Ink-jet recording techniques are recording techniques, wherein a fine ink droplet is caused to fly with various actuation principles and adhered to a recording material, such as paper, and wherein an image, a letter, or the like, is thus recorded. The ink-jet recording techniques have advantages in that the printing is capable of being performed quickly with low noise. As ink-jet printers used for the ink-jet recording techniques, there have been known a serial head type ink-jet printer, wherein an ink-jet head moves and scans in a direction intersecting with the direction of conveyance of the recording material, and a line head type ink-jet printer, wherein the ink-jet heads are secured and arrayed in a direction intersecting with the direction of conveyance of the recording material.

With the serial head type ink-jet printer, while the recording material is being conveyed, the ink-jet head is moved in the direction intersecting perpendicularly to the direction of conveyance of the recording material, and the image is thus formed. Though the serial head type ink-jet printer is easy to perform maintenance, since the ink-jet head is actuated for the reciprocal movements, it is not always easy to cope with a quick printing operation.

With the line head type ink-jet printer, a secured type recording head composed of ink-jet heads arrayed so as to stand side by side with respect to the direction intersecting perpendicularly to the direction of conveyance of the recording material is used, and the recording operation is performed only with sub-scanning for feeding the recording material in the direction of conveyance. While the recording of one line in one lot by the jetting-out of the ink composition from the ink-jet heads is being performed successively, paper feed by a predetermined distance is performed, and an image is thus recorded over the entire area of the recording material. Therefore, the line head type ink-jet printer appropriate for a quick printing operation. However, since the ink jet heads are secured, it is not always possible to perform maintenance easily.

In cases where an aqueous type ink composition utilizing water as a principal solvent is used for the ink-jet recording techniques described above, the phenomena, such as ink composition thickening and coloring material deposition, occur in the vicinity of nozzles due to evaporation of water contained in the ink composition, and the problems are encountered in that the ink composition jetting-out performance becomes bad, particularly, the intermittent jetting-out performance becomes bad.

In order for the aforesaid problems to be solved, from the aspect of the apparatus for jetting out the ink composition, techniques for actuating piezoelectric devices to an extent such that the ink composition may not be jetted out, vibrating meniscuses, thereby stirring the ink composition, and suppressing the ink composition thickening are described in, for example, patent literatures 1 and 2. Also, a technique in the so-called serial type ink-jet recording apparatus, wherein ink composition droplets are jetted out to perform the printing operation at the time at which the head has moved to a maintenance position, or the like, and wherein the lowering of the ink composition jetting-out performance is thereby prevented, is described in a patent literature 3. Further, an apparatus for detecting an alteration of ink composition viscosity, performing recovery processing for a thickened liquid-state when necessary, performing jetting-out actuation or print data compensation in accordance with the viscosity of the ink composition, and thereby coping with the lowering of the jetting-out performance is described in a patent literature 4.

However, with the techniques for actuating the piezoelectric device as described in the patent literatures 1 and 2, the problems are encountered in that electric power requirement is not kept low. Also, in cases where the preliminary jetting-out operation is performed frequently as in the technique described in the patent literature 3, the problems occur in that the ink composition is wasted. Further, though the techniques described in the patent literatures 1 to 4 are applicable to the serial head type ink-jet printer, it is not always possible for the aforesaid techniques to be applied to the line head type ink-jet printer since, for example, it is not easy to locate a preliminary jetting-out mechanism.

In order for the lowering of the intermittent jetting-out performance to be suppressed, aqueous type ink compositions having been improved have also been known. An aqueous type ink composition containing acetylene glycol is proposed in a patent literature 5. Also, an aqueous type ink composition containing a decaglycerol fatty acid ester is proposed in a patent literature 6.

Patent literature 1: Japanese Unexamined Patent Publication No. 2002-283546
Patent literature 2: Japanese Unexamined Patent Publication No. 2004-202708
Patent literature 3: Japanese Unexamined Patent Publication No. 8 (1996)-118674
Patent literature 4: Japanese Unexamined Patent Publication No. 2004-299341
Patent literature 5: Japanese Unexamined Patent Publication No. 54 (1979)-005871
Patent literature 6: Japanese Unexamined Patent Publication No. 4 (1992)-008777

DISCLOSURE OF THE INVENTION

Problems Which the Invention Aims at Solving

However, with the aqueous type ink compositions described in the patent literatures 5 and 6 described above, it is not always possible to suppress the lowering of the intermittent jetting-out performance to a satisfactory level. Particularly, as for the line head type ink-jet printer, the maintenance of which is not easy to perform, there is a strong demand for an aqueous type ink composition having good jetting-out performance.

In view of the above circumstance, the object of the present invention is to provide an aqueous ink-jet ink composition having good intermittent jetting-out performance.

Means for Solving the Problems

The present invention provides an aqueous ink-jet ink composition, containing:

i) a polyglycerol fatty acid ester, in which the number of carbon atoms of the fatty acid moiety is equal to 14, the polyglycerol fatty acid ester being contained in a proportion falling within the range of more than 0.1% by mass to less than 3.5% by mass, and ii) an acetylene glycol, in which the number of mols of ethylene oxide added is equal to at least 10 mols, the acetylene glycol being contained in a proportion falling within the range of 0.2% by mass, inclusive, to 10% by mass, inclusive.

The aqueous ink-jet ink composition in accordance with the present invention should preferably be modified such that the aqueous ink-jet ink composition is used for a line head type ink-jet printer.

Effects of the Invention

The aqueous ink-jet ink composition in accordance with the present invention contains: (i) the polyglycerol fatty acid ester, in which the number of carbon atoms of the fatty acid moiety is equal to 14, the polyglycerol fatty acid ester being contained in a proportion falling within the range of more than 0.1% by mass to less than 3.5% by mass, and (ii) the acetylene glycol, in which the number of mols of ethylene oxide added is equal to at least 10 mols, the acetylene glycol being contained in a proportion falling within the range of 0.2% by mass, inclusive, to 10% by mass, inclusive. Therefore, with the aqueous ink-jet ink composition in accordance with the present invention, the ink composition jetting-out is possible even after the jetting-out operation has been halted for a period of time of at least 10 minutes, and the intermittent jetting-out performance is capable of being enhanced. Accordingly, the jetting-out operation is capable of being stabilized, and lowering of image quality is capable of being suppressed. Also, since the apparatus maintenance is capable of being relieved, the time required for the printing operation is capable of being shortened, and a running cost is capable of being kept low. Further, secondary transfer staining occurring immediately after the printing operation has been performed is capable of being prevented.

Particularly, the aqueous ink-jet ink composition in accordance with the present invention is capable of being used also for the line head type ink-jet printer, whose apparatus maintenance is ordinarily not easy to perform. The aqueous ink-jet ink composition in accordance with the present invention thus makes it possible to achieve the jetting-out stabilization, which was not capable of being achieved with the conventional aqueous ink-jet ink compositions.

BEST MODE FOR CARRYING OUT THE INVENTION

Figure 1:
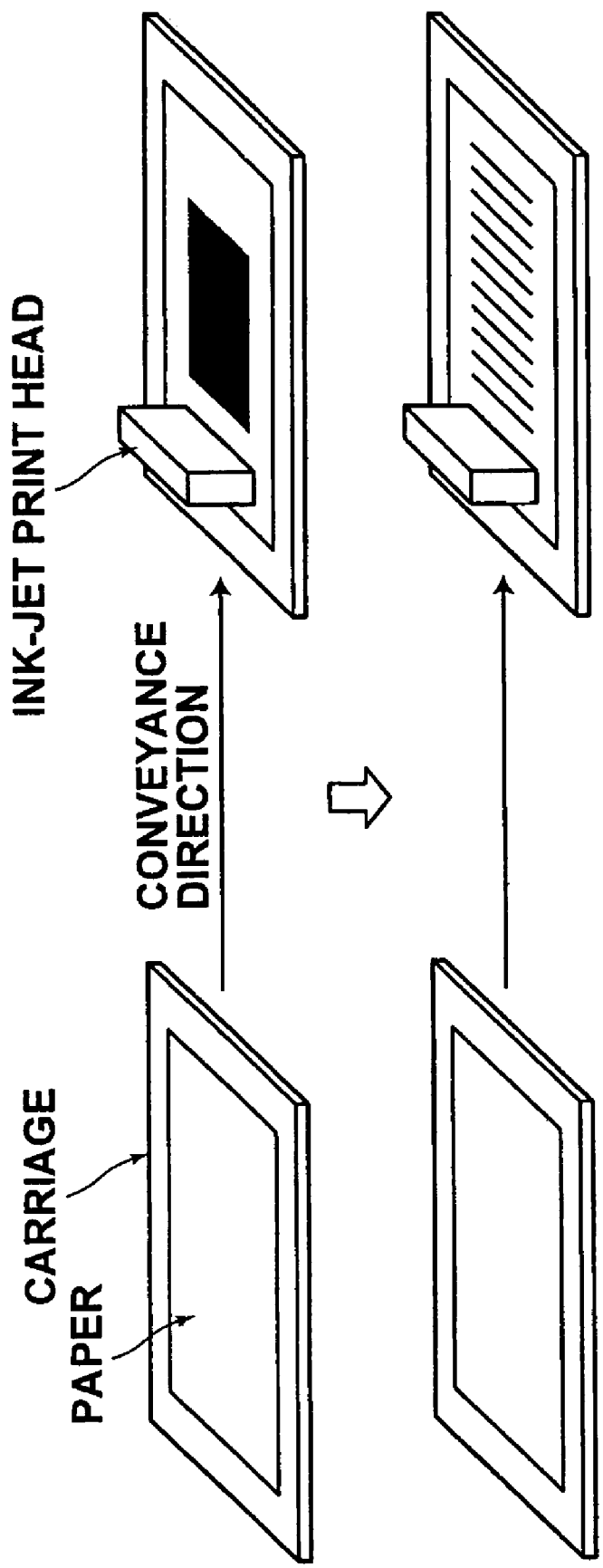
FIG. 1 is a schematic explanatory view showing how intermittent jetting-out performance is evaluated.

The aqueous ink-jet ink composition in accordance with the present invention is characterized by containing: (i) the polyglycerol fatty acid ester, in which the number of carbon atoms of the fatty acid moiety is equal to 14, the polyglycerol fatty acid ester being contained in a proportion falling within the range of more than 0.1% by mass to less than 3.5% by mass, and (ii) the acetylene glycol, in which the number of mols of ethylene oxide added is equal to at least 10 mols, the acetylene glycol being contained in a proportion falling within the range of 0.2% by mass, inclusive, to 10% by mass, inclusive.

The polyglycerol fatty acid ester, in which the number of carbon atoms of the fatty acid moiety is equal to 14, (hereinbelow referred to as the predetermined polyglycerol fatty acid ester) may be hexaglyceryl myristate, decaglyceryl myristate, or the like, and should preferably be Decaglyn 1-M, Hexaglyn 1-M (each of which is supplied by Nikko Chemicals Co.), or the like. The term "number of carbon atoms of a fatty acid moiety being equal to 14" as used herein embraces the cases, wherein the number of carbon atoms of a straight-chain part of the fatty acid is equal to 14, and the cases wherein the number of carbon atoms of the fatty acid, including the number of carbon atoms of a side-chain part of the fatty acid, is equal to 14. Also, the polyglycerol moiety may have a polymerization degree falling within the range of 2 to 20. Each of the polyglycerol moieties having different polymerization degrees may be used alone, or two or more polyglycerol moieties having different polymerization degrees may be used in combination.

The acetylene glycol, in which the number of mols of ethylene oxide added is equal to at least 10 mols, (hereinbelow referred to as the predetermined acetylene glycol) should preferably be Surfynol 465 (the number of mols of ethylene oxide added: 10 mols), Surfynol 485 (the number of mols of ethylene oxide added: 30 mols) (each of which is supplied by Air Products Japan, Inc.), or the like. The predetermined acetylene glycol is contained in a proportion falling within the range of 0.2% by mass, inclusive, to 10% by mass, inclusive, and should preferably be contained in a proportion falling within the range of more than 0.2% by mass to less than 6% by mass.

If the proportion of the predetermined polyglycerol fatty acid ester used in the present invention is not more than 0.1% by mass, the enhancement of the intermittent jetting-out performance will not be capable of being expected. Also, since the predetermined polyglycerol fatty acid ester is a viscous liquid at the room temperature, if the proportion of the predetermined polyglycerol fatty acid ester is not less than 3.5% by mass, the viscosity of the ink composition will become high, and the jetting-out performance will become bad. Further, if the proportion of the predetermined acetylene glycol is less than 0.2% by mass, the enhancement of the intermittent jetting-out performance will not be capable of being expected, and permeability with respect to a recording material will become bad. Furthermore, if the proportion of the predetermined acetylene glycol is more than 10% by mass, foaming characteristics and foam stability of the predetermined polyglycerol fatty acid ester will become high, and the jetting-out stability and initial ink composition filling characteristics will become bad.

Besides the predetermined polyglycerol fatty acid ester and the predetermined acetylene glycol described above, the aqueous ink-jet ink composition in accordance with the present invention may contain constituent elements, such as water, a pigment or a dye, a dispersing agent, and the like, which are ordinarily contained in aqueous ink-jet ink compositions.

As the pigment, it is possible to use inorganic pigments and organic pigments, which are ordinarily used in the fields of the printing technique. Specifically, it is possible to use a wide variety of known pigments, such as carbon black, cadmium red, molybdenum red, chrome yellow, cadmium yellow, Titan Yellow, chromium oxide, viridian, Cobalt Green, ultramarine blue, Prussian Blue, cobalt blue, an azo type pigment, a phthalocyanine type pigment, a quinacridone type pigment, an isoindolinone type pigment, a dioxane type pigment, a threne type pigment, a perylene type pigment, a perinone type pigment, a thioindigo type pigment, a quinophthalone type pigment, and a metal complex pigment.

Examples of the dispersing agents include activators, such as a higher fatty acid salt, an alkyl sulfate, an alkyl ester sulfate, an alkyl sulfonate, a sulfo succinate, a naphthalene sulfonate, an alkyl phosphate, a polyoxyalkylene alkyl ether phosphate, a polyoxyalkylene alkyl phenyl ether, a polyoxyethylene polyoxypropylene glycol, a glycerol ester, a sorbitan ester, a polyoxyethylene fatty acid amide, and amine oxide; and block copolymers, random copolymers, and salts thereof, each of which copolymers is constituted of at least two kinds of monomers selected from the group consisting of styrene, styrene derivatives, vinylnaphthalene derivatives, acrylic acid, acrylic acid derivatives, maleic acid, maleic acid derivatives, itaconic acid, itaconic acid derivatives, fumaric acid, and fumaric acid derivatives.

The dyes should preferably be water-soluble dyes. Examples of the dyes include an azo dye, a methine dye, an azomethine dye, axanthene dye, aquinone dye, aphthalocyanine dye, a triphenylmethane dye, and a diphenylmethane dye.

The pigments or the dyes enumerated above may be used alone or in combination. The proportion of the pigment or the dye contained should preferably fall within the range of 0.01% by mass to 20% by mass with respect to the total quantity of the ink composition.

Examples of water-soluble solvents used preferably include alcohols (suchasmethanol, ethanol, propanol, isopropanol, butanol, isobutanol, secondarybutanol, tertiarybutanol, pentanol, hexanol, cyclohexanol, and benzyl alcohol), polyhydric alcohols (such as ethylene glycol, diethylene glycol, triethylene glycol, a polyethylene glycol, propylene glycol, dipropylene glycol, a polypropylene glycol, butylene glycol, hexanediol, pentanediol, glycerol, hexanetriol, and thiodiglycol), polyhydric alcohol ethers (such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monomethyl ether, propylene glycol monobutyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether), amines (such as ethanolamine, diethanolamine, triethanolamine, N-methyl diethanolamine, N-ethyl diethanolamine, morpholine, N-ethyl morpholine, ethylenediamine, diethylenediamine, triethylenetetramine, tetraethylenepentamine, polyethyleneimine, pentamethyldiethylenetriamine, and tetramethylpropylenediamine), amides (such as formamide, N,N-dimethyl formamide, and N,N-dimethyl acetamide), heterocyclic compounds (such as 2-pyrrolidone, N-methyl-2-pyrrolidone, cyclohexyl pyrrolidone, 2-oxazolidinone, and 1,3-dimethyl-2-imidazolidinone), sulfoxides (such as dimethyl sulfoxide), sulfones (such as sulfolane), urea, acetonitrile, and acetone.

When necessary, besides the constituents described above, the ink composition in accordance with the present invention may contain various known additives in accordance with the purposes of enhancement of performance, such as jetting-out stability, print head and ink cartridge compatibility, storage stability, and image storability. Examples of the additives include a viscosity modifier, a specific resistance adjusting agent, a film forming agent, an ultraviolet light absorber, an anti-oxidant, a fading preventing agent, and a rust preventive agent.

The aqueous ink-jet ink composition in accordance with the present invention will further be illustrated by the following non-limitative examples.

EXAMPLES

Example 1 to Comparative Example 12

A polyglycerol fatty acid ester, an acetylene glycol, a pigment, a water-soluble solvent, and purified water listed in Table 1 and Table 2 were mixed together successively. Thereafter, the resulting mixture was filtered with a filter having a pore size of 0.8 μm, and an ink composition was thus prepared. The numerical value listed in Table 1 and Table 2 represents the parts by mass. In Table 1 and Table 2, PG represents the polymerization degree of the polyglycerol moiety, C represents the number of carbon atoms of the fatty acid moiety, and EO represents the number of mols of ethylene oxide added.

The polyglycerol fatty acid ester used was purified in the manner described below. By way of example, howdecaglyceryl myristate was purified will be described below. Firstly, 30 g of decaglyceryl myristate (Decaglyn1-M, supplied by Nikko Chemicals Co.) was dissolved in 100 g of isobutanol and heated to a temperature of 80° C. Thereafter, the resulting solution was introduced into a separatory funnel and was washed with 100 ml of a saturated aqueous sodium chloride solution. The resulting aqueous layer was removed, and the remaining layer was washed again with 100 ml of a saturated aqueous sodium chloride solution. The resulting aqueous layer was removed, the solvent was removed from the isobutanol solution by use of an evaporator, and 21 g of the polyglycerol fatty acid ester was thus obtained. As for other kinds of the polyglycerol fatty acid esters, purification was performed in the same manner as that described above.

As for each of the ink compositions having been prepared in Examples 1 to 12 and Comparative Examples 1 to 12, the intermittent jetting-out performance and the secondary transfer staining were evaluated in the manner described below.

(Evaluation of Intermittent Jetting-Out Performance)

The evaluation was made under a constant-temperature constant-humidity environment at a temperature of 23° C. and a humidity of 50%. As the apparatus, an ink-jet print head CB1 (supplied by Toshiba Tec Corporation) and a carriage having a paper conveyance speed of 0.41 m/s were used. As illustrated in FIG. 1, the ink-jet head CB1 was secured such that the nozzles were arrayed so as to stand side by side with respect to the direction intersecting perpendicularly to direction of the paper conveyance, and such that the spacing between each nozzle and the paper at the time of the printing operation was equal to 1 mm. As the paper, RISO HC Paper Mat IJ A4 Size (supplied by Riso Kagaku Corporation) was used.

The predetermined ink composition was filled in the head, and a 10 cm solid image was printed under the conditions of an actuation frequency of 4.8 kHz and a jetting-out volume of 42 pL per dot. Thereafter, the jetting-out operation was halted. After the head was left to stand for a predetermined period of time (5 minutes and 10 minutes), a line image comprising 50 lines located at intervals of 30 dots was printed under the conditions of an actuation frequency of 4.8 kHz and a jetting-out volume of 6 pL per dot. The printed lines were observed visually, and the number of lines, at which a jetting-out failure occurred, was counted. In cases where the jetting-out failure did not occur, and the ink composition was jetted out normally at the stages of the first line and subsequent lines in the printing operations performed after the halt time of 5 minutes and after the halt time of 10 minutes, the intermittent jetting-out performance was evaluated as being "excellent". In cases where the jetting-out failure occurred only at the stage of the first line, the intermittent jetting-out performance was evaluated as being "good". In cases where the jetting-out failure occurred successively up to the stage of the second or third line, the intermittent jetting-out performance was evaluated as being "fair". In cases where the jetting-out failure occurred successively up to the stage of the fourth line or the subsequent lines, the intermittent jetting-out performance was evaluated as being "poor".

(Evaluation of Secondary Transfer Staining)

Figure 2:
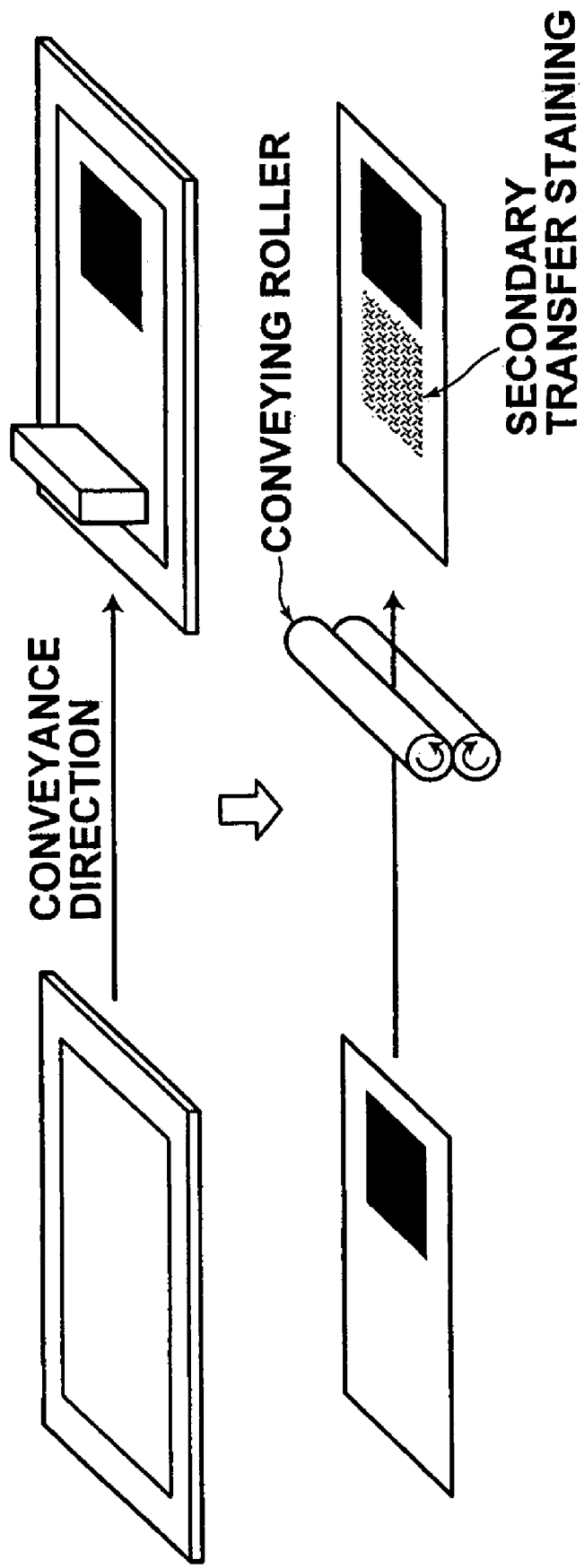
FIG. 2 is a schematic explanatory view showing how secondary transfer staining is evaluated.

The evaluation was made under a constant-temperature constant-humidity environment at a temperature of 23° C. and a humidity of 50%. As the apparatus, conveying rollers made from NBR rubber and having a paper conveyance speed of 0.41 m/s and a nip pressure of 5 kPa were used. As the paper, Riso Paper Thin Type A4 Size (supplied by Riso Kagaku Corporation) was used. As illustrated in FIG. 2, a 10 cm solid image was printed in the top region of the paper under the conditions of an actuation frequency of 4.8 kHz and a jetting-out volume of 42 pL per dot. At a stage three seconds after the printing operation had been performed, the paper was passed between the conveying rollers. After the paper had been passed between the conveying rollers, staining in the blank region of the paper was evaluated visually. In cases where the secondary transfer staining did not occur, the secondary transfer staining was evaluated as being "good". In cases where the secondary transfer staining occurred, the secondary transfer staining was evaluated as being "poor".

The results shown in Tables 1 and 2 were obtained.

TABLE 1

| Ink constituent | | Example 1 | 2 | 3 | 4 | 5 | 6 |
|---|---|---|---|---|---|---|---|
| Pigment dispersion (pigment: 20%) | | 52 | 52 | 52 | 50 | 50 | 50 |
| Glycerol | | 28 | 28 | 28 | 25 | 25 | 25 |
| N-Methyl-2-pyrrolidone | | 18 | 18 | 18 | 14.5 | 15.7 | 15.8 |
| Ethylene glycol | | | | | | | |
| Purified water | | | | | 8 | 8 | 8 |
| Hexaglyceryl myristate | PG6 C14 | 1 | | | | | |
| Decaglyceryl myristate | PG10 C14 | | 1 | 1 | 0.5 | 0.3 | 0.2 |
| Acetylene glycol (Surfynol 465) | EO 10 | 1 | 1 | | 2 | 1 | 1 |
| Acetylene glycol (Surfynol 485) | EO 30 | | | 1 | | | |
| Hexaglyceryl laurate | PG6 C12 | | | | | | |
| Hexaglyceryl oleate | PG6 C18 | | | | | | |
| Decaglyceryl laurate | PG10 C12 | | | | | | |
| Decaglyceryl stearate | PG10 C18 | | | | | | |
| Decaglyceryl oleate | PG10 C18 | | | | | | |
| Acetylene glycol (Surfynol 420) | EO 3.5 | | | | | | |
| Total | | 100 | 100 | 100 | 100 | 100 | 100 |
| Number of jetting-out failure lines | 5 min. | 1 | 1 | 1 | 0 | 0 | 1 |
| | 10 min. | 1 | 1 | 1 | 0 | 0 | 1 |
| Intermittent jetting-out performance | | good | good | good | excellent | excellent | good |
| Secondary transfer staining | | good | good | good | good | good | good |

| Ink constituent | | Example 7 | 8 | 9 | 10 | 11 | 12 |
|---|---|---|---|---|---|---|---|
| Pigment dispersion (pigment: 20%) | | 50 | 50 | 50 | 50 | 50 | 50 |
| Glycerol | | 25 | 25 | 25 | 25 | 25 | 23 |
| N-Methyl-2-pyrrolidone | | 13.7 | 16.4 | 11 | 16.5 | 10 | 14 |
| Ethylene glycol | | | | | | | |
| Purified water | | 8 | 8 | 8 | 8 | 8 | 9.3 |
| Hexaglyceryl myristate | PG6 C14 | | | | | | |
| Decaglyceryl myristate | PG10 C14 | 3 | 0.3 | 1 | 0.3 | 1 | 3.2 |
| Acetylene glycol (Surfynol 465) | EO 10 | 0.3 | 0.3 | 5 | 0.2 | 6 | 0.5 |
| Acetylene glycol (Surfynol 485) | EO 30 | | | | | | |
| Hexaglyceryl laurate | PG6 C12 | | | | | | |
| Hexaglyceryl oleate | PG6 C18 | | | | | | |
| Decaglyceryl laurate | PG10 C12 | | | | | | |
| Decaglyceryl stearate | PG10 C18 | | | | | | |
| Decaglyceryl oleate | PG10 C18 | | | | | | |
| Acetylene glycol (Surfynol 420) | EO 3.5 | | | | | | |
| Total | | 100 | 100 | 100 | 100 | 100 | 100 |
| Number of jetting-out failure lines | 5 min. | 1 | 1 | 1 | 2 | 1 | 2 |
| | 10 min. | 1 | 1 | 1 | 1 | 2 | 3 |
| Intermittent jetting-out performance | | good | good | good | fair | fair | fair |
| Secondary transfer staining | | good | good | good | good | good | good |

TABLE 2

| Ink constituent | | Comparative Example 1 | 2 | 3 | 4 | 5 | 6 |
|---|---|---|---|---|---|---|---|
| Pigment dispersion (pigment: 20%) | | 52 | 52 | 52 | 52 | 52 | 52 |
| Glycerol | | 28 | 28 | 28 | 28 | 28 | 28 |
| N-Methyl-2-pyrrolidone | | 19 | 19 | | 19 | 19 | 18 |
| Ethylene glycol | | | | 19 | | | |
| Purified water | | | | | | | |
| Hexaglyceryl myristate | PG6 C14 | 1 | | | | | |
| Decaglyceryl myristate | PG10 C14 | | 1 | 1 | | | 1 |
| Acetylene glycol (Surfynol 465) | EO 10 | | | | | | |
| Acetylene glycol (Surfynol 485) | EO 30 | | | | 1 | | |
| Hexaglyceryl laurate | PG6 C12 | | | | | | |
| Hexaglyceryl oleate | PG6 C18 | | | | | | |
| Decaglyceryl laurate | PG10 C12 | | | | | | |
| Decaglyceryl stearate | PG10 C18 | | | | | 1 | |
| Decaglyceryl oleate | PG10 C18 | | | | | | |
| Acetylene glycol (Surfynol 420) | EO 3.5 | | | | | | 1 |
| Total | | 100 | 100 | 100 | 100 | 100 | 100 |
| Number of jetting-out failure lines | 5 min. | 3 | 2 | 6 | 7 | 14 | 6 |
| | 10 min. | 3 | 1 | 6 | 8 | 13 | 10 |
| Intermittent jetting-out performance | | fair | fair | poor | poor | poor | poor |
| Secondary transfer staining | | poor | poor | poor | good | poor | good |

| Ink constituent | | Comparative Example 7 | 8 | 9 | 10 | 11 | 12 |
|---|---|---|---|---|---|---|---|
| Pigment dispersion (pigment: 20%) | | 52 | 52 | 52 | 52 | 50 | 52 |
| Glycerol | | 28 | 28 | 28 | 28 | 25 | 23 |
| N-Methyl-2-pyrrolidone | | 18 | 18 | 18 | 18 | 15.9 | 19 |
| Ethylene glycol | | | | | | | |
| Purified water | | | | | | 8 | 1.5 |
| Hexaglyceryl myristate | PG6 C14 | | | | | | |
| Decaglyceryl myristate | PG10 C14 | | | | | 0.1 | 3.5 |
| Acetylene glycol (Surfynol 465) | EO 10 | 1 | 1 | 1 | | 1 | 1 |
| Acetylene glycol (Surfynol 485) | EO 30 | | | | 1 | | |
| Hexaglyceryl laurate | PG6 C12 | 1 | | | | | |
| Hexaglyceryl oleate | PG6 C18 | | 1 | | | | |
| Decaglyceryl laurate | PG10 C12 | | | 1 | | | |
| Decaglyceryl stearate | PG10 C18 | | | | | | |
| Decaglyceryl oleate | PG10 C18 | | | | 1 | | |
| Acetylene glycol (Surfynol 420) | EO 3.5 | | | | | | |
| Total | | 100 | 100 | 100 | 100 | 100 | 100 |
| Number of jetting-out failure lines | 5 min. | 13 | 15 | 13 | 14 | 7 | 2 |
| | 10 min. | 19 | 18 | 19 | 18 | 8 | 4 |
| Intermittent jetting-out performance | | poor | poor | poor | poor | poor | poor |
| Secondary transfer staining | | good | good | good | good | good | good |

(Results of Evaluations)

Ordinarily, in cases where the printing operation is performed again after the printing operation has been halted for a predetermined period of time, the jetting-out failure (jetting-out non-performance, lowering of image density, or irregularity of position of droplet deposition) occurs at the initial printing stage of several lines to several tens of lines. However, with the aqueous ink-jet ink composition (in each of Examples 1 to 12) in accordance with the present invention, which contained the predetermined polyglycerol fatty acid ester and the predetermined acetylene glycol in combination, little jetting-out failure occurred. It was thus confirmed that the aqueous ink-jet ink composition in accordance with the present invention had the significantly larger effects of improving the intermittent jetting-out performance than the aqueous ink-jet ink composition (in each of Comparative Examples 1, 2, and 3), which contained only the predetermined polyglycerol fatty acid ester, the aqueous ink-jet ink composition (in Comparative Example 4), which contained only the predetermined acetylene glycol, and the aqueous ink-jet ink composition (in Comparative Example 5), which contained the different kind of the polyglycerol fatty acid ester.

Also, with the aqueous ink-jet ink composition (in Comparative Example 6), which contained the predetermined polyglycerol fatty acid ester and the different kind of the acetylene glycol in combination, and the aqueous ink-jet ink composition (in each of Comparative Examples 7 to 10), which contained the different kind of the polyglycerol fatty acid ester and the predetermined acetylene glycol in combination, though the secondary transfer staining was not found, the intermittent jetting-out performance was apt to become lower than the aforesaid aqueous ink-jet ink composition (in each of Comparative Examples 1, 2, and 3), which contained only the predetermined polyglycerol fatty acid ester, and the aforesaid aqueous ink-jet ink composition (in Comparative Example 4), which contained only the predetermined acetylene glycol. It was thus confirmed that the intermittent jetting-out performance was improved only in cases where the predetermined polyglycerol fatty acid ester and the predetermined acetylene glycol are contained in combination in accordance with the present invention.

Further, even with the aqueous ink-jet ink composition, which contained the predetermined polyglycerol fatty acid ester and the predetermined acetylene glycol in combination, in cases where the proportion of the predetermined polyglycerol fatty acid ester contained was equal to at most 0.1% by mass (in Comparative Example 11), and in cases where the proportion of the predetermined polyglycerol fatty acid ester contained was equal to at least 3.50 by mass (in Comparative Example 12), the intermittent jetting-out performance was not improved sufficiently.

As described above, the aqueous ink-jet ink composition in accordance with the present invention contains: (i) the polyglycerol fatty acid ester, in which the number of carbon atoms of the fatty acid moiety is equal to 14, the polyglycerol fatty acid ester being contained in a proportion falling within the range of more than 0.1% by mass to less than 3.5% by mass, and (ii) the acetylene glycol, in which the number of mols of ethylene oxide added is equal to at least 10 mols, the acetylene glycol being contained in a proportion falling within the range of 0.2% by mass, inclusive, to 10% by mass, inclusive. Therefore, with the aqueous ink-jet ink composition in accordance with the present invention, the ink composition jetting-out was possible even after the jetting-out operation had been halted for a period of time of at least 10 minutes, and the intermittent jetting-out performance was capable of being enhanced. Also, the secondary transfer staining occurring immediately after the printing operation had been performed was capable of being prevented.

The invention claimed is:

1. An aqueous inkjet ink composition, containing:
i) a polyglycerol fatty acid ester, in which the number of carbon atoms of the fatty acid moiety is equal to 14, the polyglycerol fatty acid ester being contained in a proportion falling within the range of more than 0.1% by mass to less than 3.5% by mass, and
ii) an acetylene glycol, in which the number of mols of ethylene oxide added is equal to at least 10 mols, the acetylene glycol being contained in a proportion falling within the range of 0.2% by mass, inclusive, to 10% by mass, inclusive.

2. An aqueous ink-jet ink composition as defined in claim 1 wherein the aqueous ink-jet ink composition is utilized for a line head type ink-jet printer.

* * * * *